United States Patent [19]

Neumann

[11] Patent Number: 4,561,839

[45] Date of Patent: Dec. 31, 1985

[54] THERMAL DEBURRING APPARATUS AND METHOD

[75] Inventor: Gerhard Neumann, Stuttgart, Fed. Rep. of Germany

[73] Assignee: Robert Bosch GmbH, Stuttgart, Fed. Rep. of Germany

[21] Appl. No.: 609,321

[22] Filed: May 11, 1984

[30] Foreign Application Priority Data

Jun. 9, 1983 [DE] Fed. Rep. of Germany ....... 3320806

[51] Int. Cl.$^4$ ............................................. F23N 5/20
[52] U.S. Cl. ......................................... 431/6; 431/74
[58] Field of Search ...................... 431/1, 6, 259, 74; 432/25, 200, 205

[56] References Cited

U.S. PATENT DOCUMENTS 2,920,450  1/1960  Seglem .................................. 431/259
4,474,547 10/1984  Drexel et al. ............................. 431/1
4,487,576 12/1984  Martini .................................. 432/200

Primary Examiner—Carroll B. Dority, Jr.
Attorney, Agent, or Firm—Frishauf, Holtz, Goodman & Woodward

[57] ABSTRACT

To avoid venting of a deburring chamber and associated equipment after charge of the chamber with an explosive mixture if a spark plug (3a) has failed to ignite the mixture, a glow ignition block (4) is located in the path of gas communication between a mixing block (3) in which the spark plug is retained, and a glow plug (8) is located to have its glow portion exposed to the combustible gas mixture, preferably in a bypass (9) to a main gas path. A thermal element (12) monitors whether, upon application of an ignition pulse to the spark plug (3a), ignition has occurred by sensing a sharp temperature pulse; upon failure to sense such a temperature pulse, the glow plug is energized for ignition of the combustible mixture thereby. The spark plug may be of the vehicular internal combustion engine type; and the glow plug may, for example, be similar to "pre-glow" plugs used in vehicular-type Diesel engines.

13 Claims, 3 Drawing Figures

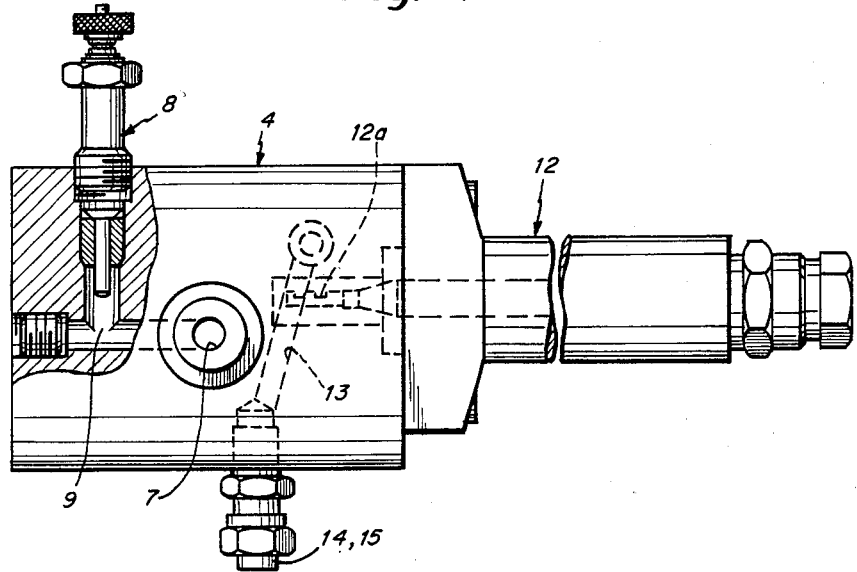
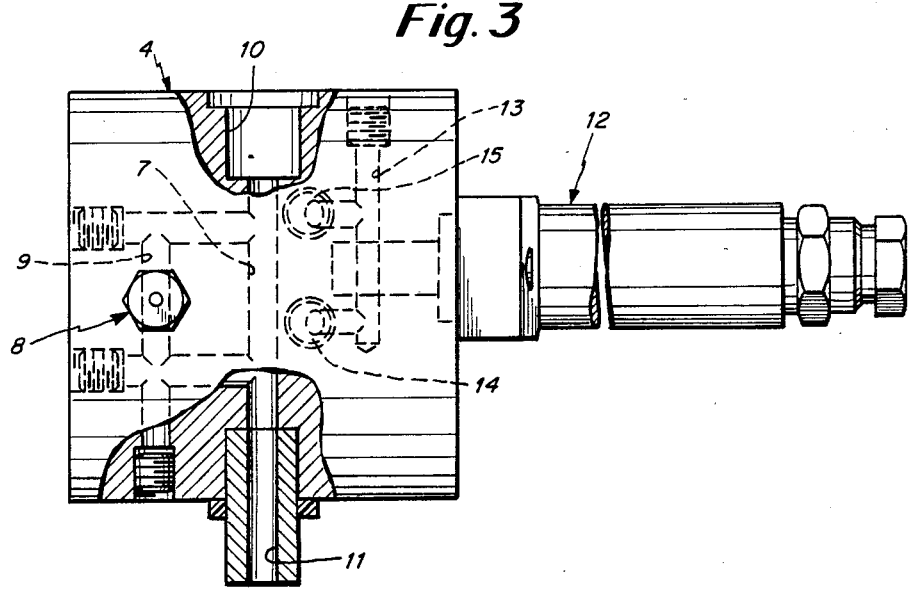

THERMAL DEBURRING APPARATUS AND METHOD

Reference to related applications, assigned to the assignee of the present invention:

U.S. Ser. No. 461,185, filed Jan. 26, 1983, MARTINI, now U.S. Pat. No. 4,487,576;

U.S. Ser. No. 461,186, filed Jan. 26, 1983, HIEBER, now U.S. Pat. No. 4,486,173.

The present invention relates to thermal deburring apparatus, and more particularly to apparatus suitable to include a workpiece in a vessel in which an explosive mixture, for example of hydrogen and oxygen, is introduced which is ignited to burn off burrs, flashings, and the like, on the workpieces, and a deburring method.

BACKGROUND

Thermal deburring apparatus is known; the workpieces to be treated are introduced into a pressure vessel which is filled with a combustible, typically an explosive gas mixture. During combustion, temperatures within the vessel rise to extreme values, in the order of between 2000° to 3000° C. Under such high temperatures, burrs, flashings and other surface areas which are not smooth are combusted, since the relationship of surface area to volume of such burrs, flashings, and the like is high. The workpieces themselves heat only slightly.

The combustion gas usually includes a combustible gas and oxygen, in which oxygen is present in excess. Combustion is initiated by a spark, typically by a spark plug identical or similar to spark plugs customarily used in automotive-type internal combustion engines. It is customary to provide an ignition block which is formed internally with a mixing chamber, in fluid communication with the combustion or treatment chamber itself, on which the spark plug is located, the spark gap itself being introduced into the fluid communication to the combustion chamber. The mixing block, additionally, is used to mix oxygen and the combustion gas.

It has been found that, under some conditions, difficulties arise in igniting the gas mixture. The spark plug may malfunction, or other conditions may prevent proper ignition. For example, ignition can be inhibited by presence of moisture, dampness, or under conditions of poor mixture of the gases introduced into the mixing block and/or the combustion chamber. If the gas/oxygen mixture is not brought to combustion condition, that is, if no explosion results, the workpieces, of course, will not be treated. It is then necessary to vent the chamber, search for the cause of malfunction, and correct it.

Venting the chamber, with the explosive gases therein, must be carried out slowly and carefully; this process is hazardous since the danger of uncontrolled random ignition of the highly explosive gas mixture is always present. Usually, the vessel is vented by a venting valve. The mixing block is contaminated by such venting and residues and contaminants may remain therein, which may later on lead to further damage. The contamination of the mixing chamber is dependent on the size of the vessel, and, hence, of the volume which it includes, and thus of the volume of combustible gas and oxygen which is to be vented.

THE INVENTION

It is an object to insure explosion of the combustion gas within a deburring chamber even if the ignition spark plug should malfunction.

Briefly, a glow plug ignition block is introduced between the mixing block and the chamber itself, the glow plug ignition block including a glow plug, for example of the type customary to "pre-glow" vehicular-type Diesel engines. The glow plug is so positioned that the glow portion thereof is in contact with the gases to be ignited.

In accordance with a feature of the invention, ignition of the gases is sensed by sensing temperature rise, and if no temperature surge indicative of ignition has occurred, the glow plug is the energized, which will insure ignition; the temperature sensor may be used, simultaneously, to sense overall temperature arising in the system and to provide a warning indication or shut-off if the overall temperature rise in the system should exceed, over a period of time, a safe level, that is, if the overall temperature rise, apart from the sharp temperature surge during ignition, exceeds a safe level.

The system and operating method has the advantage that malfunction of the spark plug, usually included in the mixing block, will not inhibit ignition of the explosive gas mixture already introduced into the vessel, since the glow plug can still insure ignition of the explosive or combustible mixture.

The glow plug, since it has a long-time glowing period, has better ignition characteristics than the spark ignition of a spark plug. By insuring ignition, regardless of malfunction of the ignition spark plug, venting of the vessel with the uncombusted explosive mixture still present therein, can be reduced to a minimum. This substantially increases the operating reliability, as well as the useful operating period of the equipment. Additionally, the repetition time between charging and removal of workpieces, overall, and taken over a number of cycles, can be reduced since venting, due to malfunction, and the long time taken thereby can be eliminated.

In accordance with a preferred feature of the invention, the ignition glow block is formed with a main duct to pass gases from the mixing block to the chamber, and has, further a bypass in parallel thereto. The glow plug then is located such that its glow portion is exposed in the bypass. This shields the glow plug and, then, does not expose the glow plug to the full loading of the hot gas mixture when it is ignited by a spark from the ignition spark plug. It is, further, additionally possible and desirable to include a thermal element in the ignition glow block to monitor and control cooling water temperature introduced into the mixing block and also passed through the glow ignition block. The thermal element then can be used to control, automatically, energization of the glow plug if signals indicative of a temperature surge are absent after the ignition spark plug has been energized. The thermal element may, additionally, be used to control the throughout of cooling water to the mixing block and/or the ignition glow plug, and, further, to insure that excessive temperature rise in the two blocks is prevented. Excessive temperature rise of the mixing block and/or the glow ignition block may cause uncontrolled random ignition of the combustible gas mixture, which may cause damage and is hazardous.

DRAWINGS

FIG. 2 is a part-sectional side view of the glow ignition block; and

FIG. 3 is a view similar to FIG. 2, but rotated by 90° with respect to FIG. 2.

DETAILED DESCRIPTION

Figure 1:
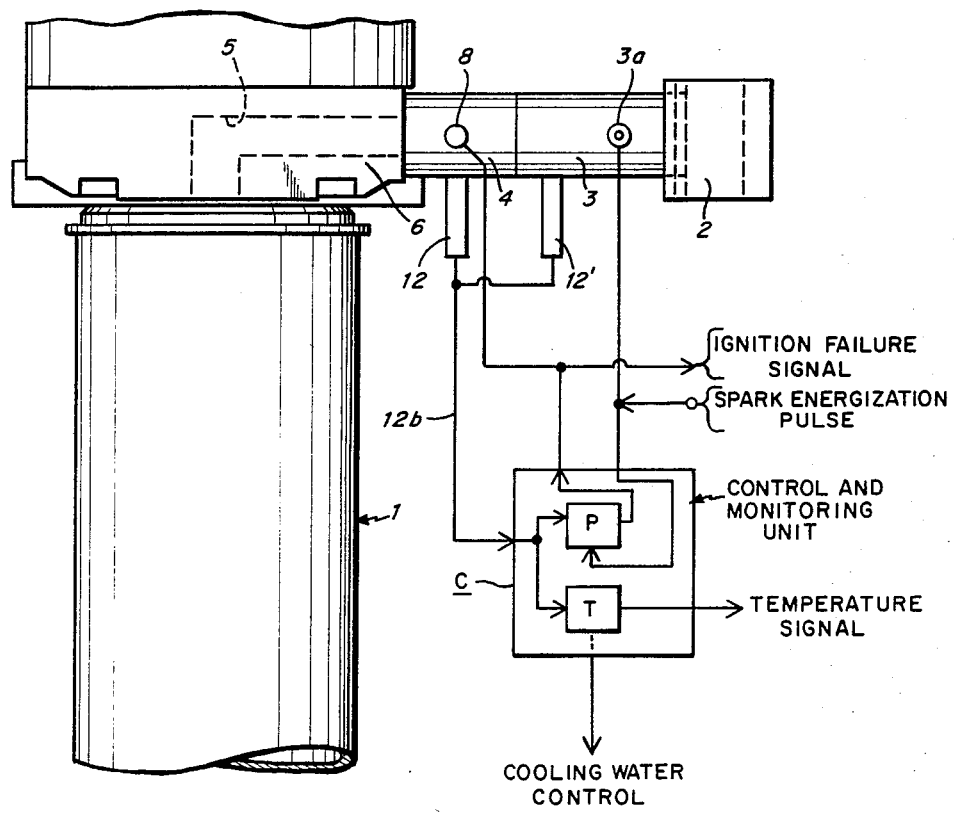
FIG. 1 is a schematic diagram illustrating a system for thermal duburring, and having a gas mixing block, a glow ignition block, and a treatment chamber.

A deburring chamber 1, for example made of heavy steel, and typically in the form of an upright cylinder, is provided to receive workpieces to be deburred, or from which flashing is to be removed. The chamber 1, preferably, is elongated in order to permit placement of long workpiece therein. The apparatus is secured to a support, only shown schematically at 2. The support also provides for conduction of gases to a mixing block which retains a mixing chamber, collectively, shown as block, or chamber 3. The mixing block or chamber 3 retains a plug 3a which, typically is a standard automotive-type spark plug. In addition, a thermal sensing element 12 (FIG. 2) may be placed in thermal sensing relationship with a cooling water duct or a gas duct 5 to a coupling element 6 and into the treatment chamber vessel 1. The element 6, typically, is closing disk or plate against which the treatment vessel 1, open at the top, can be raised, and pressed thereagainst, for example by hydraulic pressure. Suitable sealing elements and the like have been omitted from the drawing for clarity since they are well known in this art.

In accordance with the invention, a glow ignition block 4 is interposed between the mixing block 3 and the closing element 6. The glow ignition block 4 retains a glow plug 8.

As best seen in FIGS. 2 and 3, which show details of the glow block 4, the glow plug 8 is located in a bypass 9, branched and placed parallel, with respect to fluid flow, to the ignition duct 7. Ignition duct 7 is interposed in the duct 5 between the mixing block 3 and the closing element 6 of the vessel 1. The duct 7 has a connection element 10 for connection to the mixing block 3 on one side thereof, and a coupling 11 for connection to the upper closing plate 6 of the vessel 1. A thermal element 12 is located in the block 4. The thermal element 12 has a sensing portion 12a which is positioned closed to or directly in a cooling water duct 13, formed in the block 4. Cooling water is applied to the block 4 from the mixing block 3 by an inlet 14, and is drained by a cooling water drain 15. The various ducts, for manufacturing ease, can be drilled or bored from the outside and closed off at the ends by suitable closing plugs, as well known.

The glow plug 8, with the glow portion thereof exposed in the duct 9, may be of standard construction, for example similar to a glow plug for vehicular-type Diesel engines.

OPERATION

To start the apparatus, two gas measuring cylinders are charged by controlling the filling pressure and the volume of gas therein in order to control the mixing ratio and quantity of gas to be introduced into the vessel 1. The measuring cylinders, preferably, are hydraulically controlled; after they have been charged, they supply the respective gases to the mixing block 3, where the gases are intimately mixed and conducted through duct 7 of the block 4, and further through coupling 11 and duct 5 into the deburring vessel 1. They are compressed therein, for example by hydraulic compression applied to the measuring cylinders. The gases are mixed in the mixing block 3.

After the vessel 1 has been charged, and the gases supplied thereto, the supply and measuring cylinders are isolated from the system by suitable valves. The gas is then ignited by energizing the spark plug 3a. Upon occurrence of ignition, the temperature within the portion of duct 7 in the block 3 will rise abruptly, which is sensed by the thermal element 12, or an equivalent element included, for example, in the block 3. If this abrupt temperature pulse is sensed, the glow plug 8 will remain de-energized. If, however, no temperature pulse is sensed by the temperature sensor, but ignition had been commanded, the glow plug 8 within the glow igniter block 4 is energized, and heating of the glow plug will result in ignition in due course. Upon sensing of ignition due to the glow plug, automatic operation after the deburring cycle has terminated is inhibited, so that, for example, the apparatus can be checked to determine the cause for malfunction of ignition upon energization of the spark igniter plug 3a. If ignition by plug 3a fails repeatedly, maintenance of the mixing block 3 may be required.

The thermal element 12 can also be used to monitor the overall temperature state of the mixing block 3 and/or the glow igniter block 4, and, if the temperature, over a predetermined period of time rises above a predetermined level, an excessive temperature signal can be provided to inhibit further supply of combustible gases and thereby prevent danger of premature or self-ignition of the gases, and to provide a monitoring signal to supervisory personnel.

FIG. 1 illustrates the blocks 3 and 4 as separate elements; they may, of course, be constructed as a single block in which the spark ignition plug 3a as well as the glow plug 8 are located. One or more thermal elements 12, likewise, can be included in such a combined unit. The block 4 is shown, separately, merely for ease of illustration.

Various changes and modifications may be made, and any features described herein may be used with any of the others, within the scope of the inventive concept.

The method of ignition and supervising the ignition event can be easily controlled, as shown in the diagram of FIG. 1. A connection 12b leads from thermal element 12 and 12', one each shown connected to blocks 3 and 4, to a control and monitoring unit C. The control and monitoring unit, further, is connected to the spark plug 3a as well as to the glow plug 8. The signal from the temperature sensors 12, 12' is connected on the one hand through a time delay T to provide a cooling water temperature output signal. On the other hand, the sensed signal is connected to a peak detector P which senses abrupt temperature pulses or peaks. If the peak or pulses should be missing, as indicated, for example, by connecting the temperature signal to an inverting input, after the peak detector has been SET by a signal derived, for example, from the ignition spark plug 3a, the peak detector provides an output to control the glow plug 8 to be energized. At the same time, an ignition failure signal is provided, for example to inhibit further automatic operation of the system and to provide an alarm signal to an operator. The temperature signal can, additionally, be used to control cooling water throughout, temperature, and the like, and, if it rises excessively, likewise provide an alarm or control output signal. The unit T may, for example, include a limiter and threshold circuit, the limiter cutting or eliminating sharp pulses due to normal ignition and thus responding only to the average or long-term rise in temperature due to operation of the system.

I claim:

1. Thermal deburring apparatus having
a deburring chamber (1) to receive articles to be deburred;
a mixing block (3) to mix combustible gases including oxygen, and formed with a fluid communication means for said gases with the chamber;
a spark ignition means (3a) in the fluid communication means for igniting the combustible mixture of gases;
means for energizing the spark ignition means (3a) so that, as the result of a spark at the spark ignition means, the combustible gases are, normally, ignited,
and comprising, in accordance with the invention,
an ignition block (4) located between the mixing block (3) and the chamber (1) and being formed with an internal opening in fluid communication with said fluid communicating means for receiving said gases therein;
means for sensing if, upon energization of the spark ignition means (3a), the combustible gases did not ignite;
a glow plug (8) having a glow portion exposed in said opening;
means (P) for energizing the glow plug (8) upon detection of failure to ignite the combustible mixture.

2. Apparatus according to claim 1, wherein the internal opening comprises a main duct (7) in through-communication with said fluid communication means;
and a bypass (9) in parallel to said main duct, the glow plug being located for exposure in said bypass.

3. Apparatus according to claim 1, wherein the means for sensing if, upon energization of the spark ignition (3a), the combustible gases did not ignite, comprises
a thermal element (12) in thermal heat transfer relationship with respect to gases being present in said internal opening.

4. Apparatus according to claim 1, further including water cooling duct means (13, 14, 15) formed in at least one of said blocks (3, 4);
and a thermal element (12) in thermal transfer relation with respect to said cooling duct means.

5. Apparatus according to claim 4, wherein the glow plug (8), the thermal element (12) and said spark ignition means are located in a single structural unit.

6. Apparatus according to claim 4, wherein the means for sensing if, upon energization of the spark ignition means (3a), the combustible gases did not ignition, comprises
a control and monitoring unit (C) connected to the thermal element (12), said control and monitoring unit including
means (P, T) sensing and distinguishing between abrupt temperature jumps and long-term temperature rise, and providing output signals having characteristics representative of whether
(1) the abrupt temperature jump signals are sensed or not; and
(2) the temperature sensed by the signal rises, over a period of time, to a level in excess of a predetermined value;

and wherein said control and monitoring unit (C) provides an output signal if the temperature rises over a period of time above said predetermined level;
and further includes said means for energizing the glow plug (8).

7. Apparatus according to claim 6, wherein said control and monitoring unit is connected to energize the glow plug (8) if an ignition energization pulse has been applied to the spark ignition means (3a) and the thermal element has failed to sense or detect a sharp temperature jump indicative of explosive combustion of the mixture of gases, to insure ignition of the mixture of gases upon energization of the glow plug.

8. Method of insuring combustion of a combustible mixture of gases, including oxygen, in a deburring apparatus having
a deburring chamber (1) to receive articles to be deburred;
a mixing block (3) to mix the combustible gases including the oxygen, and formed with means for fluid communication with said chamber (1);
a spark ignition means (3a) in the fluid communication means for igniting the mixture of gases;
and a glow plug (8) havng a glow portion exposed to at least a portion of said mixture of gases,
the method comprising
sensing if a sudden rise in temperature occurs in said fluid communication means after energization of the spark ignition means (3a);
and, upon failure to sense such a sharp temperature rise, energizing the glow plug.

9. Method according to claim 8, including the step if inhibiting automatic energization of the spark ignition means (3a) after the glow plug has been energized.

10. Apparatus according to claim 1, wherein the means for sensing if, upon energization of the spark ignition means (3a), the combustible mixture did not ignite, comprises
means for sensing ambient conditions within the internal opening,
and a control and monitoring unit (C) coupled to the spark ignition means (3a) and including means for sensing and distinguishing between abrupt changes sensed by sensing means, and indicative of normal ignition of the combustible gases, and failure to sense abrupt changes after the spark ignition means (3a) has been energized.

11. Apparatus according to claim 10, wherein said control and monitoring unit (C) is connected to energize the glow plug (8) after an ignition energization pulse has been applied to the spark ignition means (3a) and the ambient condition sensing means has failed to sense or detect a sharp change in ambient conditions indicative of explosive combustion of the mixture of gases, energization of the glow plug insuring ignition of the mixture of gases upon energization of the glow plug.

12. Method of insuring combustion of a combustible mixture of gases, including oxygen, in a deburring apparatus having
a deburring chamber (1) to receive articles to be deburred;
a mixing block (3) to mix the combustible gases including the oxygen and formed with means for fluid communication with said chamber (1);
a spark ignition means (3a) in the fluid communication means for igniting the mixture of gases; and a glow plug (8) having a glow portion exposed to at least a portion of said mixture of gases,
the method comprising
sensing a sudden change in ambient conditions occurring in said fluid communication means after energization of the spark ignition means indicative of explosion of said combustion mixture of gases;
and, upon failure to sense such a sharp change in ambient conditions, energizing the glow plug to ignite the combustible mixture by heat emitted from the glow plug.

13. Method according to claim 12, including the step of inhibiting energization of the spark ignition means (3a) after the glow plug has been energized.

* * * * *